United States Patent
Yang

(10) Patent No.: US 8,258,755 B2
(45) Date of Patent: Sep. 4, 2012

(54) SECONDARY BATTERY CHARGING METHOD AND DEVICE

(75) Inventor: Jong-Woon Yang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 857 days.

(21) Appl. No.: 12/249,401

(22) Filed: Oct. 10, 2008

(65) Prior Publication Data

US 2009/0146613 A1  Jun. 11, 2009

(30) Foreign Application Priority Data

Dec. 7, 2007 (KR) .................. 10-2007-0126905

(51) Int. Cl.
*H02J 7/04* (2006.01)

(52) U.S. Cl. ......... 320/139; 320/119; 320/103; 320/118

(58) Field of Classification Search .............. 320/139, 320/103, 118, 119
See application file for complete search history.

(56) References Cited

U.S. PATENT DOCUMENTS

| | | | |
|---|---|---|---|
| 6,081,097 A | | 6/2000 | Seri et al. |
| 6,222,346 B1* | | 4/2001 | Mori ................ 320/134 |
| 6,373,224 B1 | | 4/2002 | Goto et al. |
| 6,400,124 B1 | | 6/2002 | Hidaka et al. |
| 2003/0085690 A1* | | 5/2003 | Shiojima ............ 320/164 |
| 2004/0246635 A1* | | 12/2004 | Morita ................ 361/1 |
| 2006/0082344 A1* | | 4/2006 | Lai et al. ........... 320/128 |
| 2006/0192531 A1* | | 8/2006 | Nishida ............ 320/128 |
| 2008/0203969 A1* | | 8/2008 | Kurihara et al. ...... 320/116 |
| 2008/0290835 A1* | | 11/2008 | Hayashi ............ 320/112 |

FOREIGN PATENT DOCUMENTS

| | | |
|---|---|---|
| CN | 101060253 B | 7/2010 |
| JP | 11-204147 | 7/1999 |
| JP | 2000-253586 | 9/2000 |
| JP | 2000-350378 | 12/2000 |
| JP | 2001-169474 | 6/2001 |
| JP | 2002-186192 | 6/2002 |
| JP | 2007-028791 | 2/2007 |
| JP | 2007-151261 | 6/2007 |
| KR | 10-2001-0078347 | 8/2001 |

(Continued)

OTHER PUBLICATIONS

Korean Office Action issued Oct. 27, 2009 in the corresponding Korean Patent Application No. 10-2007-0126905.

(Continued)

*Primary Examiner* — Jermele M Hollington
*Assistant Examiner* — Son Le
(74) *Attorney, Agent, or Firm* — Christie, Parker & Hale, LLP

(57) ABSTRACT

A method of charging a secondary battery and a charging device that can improve stability and extend the life span of the battery. When the secondary battery includes a plurality of cells, the charging method is changed when a voltage imbalance from 100 mV to 300 mV occurs among the cells. In that range, the charging method changes from a constant current-constant voltage charging method to a pulse-charging method. When the voltage imbalance is 300 mV or more, the electricity path is blocked, shutting down the battery. When the voltage imbalance is 100 mV or less, the constant current-constant voltage charging method is maintained. The method and device also stop charging when the battery reaches full charge.

23 Claims, 4 Drawing Sheets

FOREIGN PATENT DOCUMENTS

| KR | 2005-41083 | 5/2005 |
|---|---|---|
| KR | 2007-14796 | 2/2007 |

OTHER PUBLICATIONS

Japanese Office action dated Sep. 28, 2010, for corresponding Japanese Patent application 2008-312320, noting listed references in this IDS.

SIPO Office action dated Jun. 28, 2011, for corresponding Chinese Patent application 200810185746.9, with English translation, 10 pages.

Chinese Patent Publication dated Feb. 1, 2012, corresponding to Chinese Patent application 200810185746.9, 14 pages.

* cited by examiner

SECONDARY BATTERY CHARGING METHOD AND DEVICE

CROSS-REFERENCE TO RELATED APPLICATION

This application claims the benefit of Korean Patent Application No. 2007-126905, filed on Dec. 7, 2007 in the Korean Intellectual Property Office, the disclosure of which is incorporated herein by reference.

BACKGROUND OF THE INVENTION

1. Field of the Invention

Aspects of the present invention relate to a secondary battery, and more particularly, to a secondary battery charging method and device capable of enhancing the stability and extending the life span of a battery.

2. Description of the Related Art

As the use of portable electronic appliances such as mobile phones, notebook computers, camcorders and PDAs grows, secondary batteries used as power sources for these appliances are actively being developed.

Such secondary batteries include nickel-cadmium secondary batteries, lead storage batteries, nickel-metal hydride batteries, lithium ion batteries, and lithium polymer batteries. Generally, there is a demand for secondary batteries that are highly stable, easy to carry and small in size. Moreover, there is a further demand for secondary batteries that can be fully charged in a short time, have a higher capacity and last for more discharge/recharge cycles.

A secondary battery is manufactured as a cell type, and then the cell is coupled to a protective circuit to form a battery pack. The secondary battery is charged from an external power source or discharged to a load through an external terminal included in the battery pack.

The battery pack includes at least one cell. A low-capacity battery having one cell is used in compact and portable electronic appliances such as mobile phones, note book computers, cameras and so on. At the other extreme, a high-capacity battery having several cells is widely used in hybrid cars as a driving power source for the car's engine.

When an external power source is connected to the external terminal and protective circuit, the cell is charged. However, when a load is connected to the external terminal, electrical energy is provided to the load from the charged cell through the protective circuit and external terminal, and thus the cell is discharged.

A constant current-constant voltage (CC-CV) charging method is commonly used as a method of charging a secondary battery. The CC-CV charging method is performed first by charging a secondary battery with constant current, and then by charging the battery with constant voltage when the battery almost reaches its full-charge potential.

To reduce the time necessary for fully charging the battery using only the CC-CV charging method, a charging current has to be set high during the constant current charging phase. However, a high charging current is not preferable because it may degrade the performance of the battery. Therefore, to augment the CC-CV charging method, a pulse charging method has been developed, which may shorten the charging time by repeatedly pulsing between charging and pausing.

Because of repeated charging and discharging, cell degradation occurs, and the degradation degree depends on characteristics of each individual cell. Thus, the degradation degrees of the individual cells become different with time. Therefore, in a secondary battery having more than one cell, the charging/discharging time and amount are different among the cells because of the degradation differences among the individual cells during charging and discharging, and the more degraded cells are charged or discharged more rapidly. However, in a secondary battery having more than one cell, each cell is charged and discharged simultaneously, and the time is controlled according to the state of the first fully-charged or discharged cell. That is, since the most degraded cell is fully charged or discharged first, other less degraded cells are not fully charged or discharged.

Furthermore, the more degradation that occurs in the more degraded cells, the shorter is the charging/discharging time for the entire battery. As a result, the more degraded cells are even further degraded than others, which may result in generation of internal gas, ignition and explosion. Thus, the protective circuit needs to have a circuit for interrupting electrical flow to prevent charging/discharging when the voltage difference among the cells is 300 mV or more in a fully charged or fully discharged battery.

In the conventional art, problems caused by unequal degradation among cells having a voltage difference of 300 mV or more may be solved, but problems occurring when the voltage difference among the cells is less than 300 mV may not be solved. However, although serious safety problems may occur when the voltage difference among the cells is 300 mV or more, there may still be a safety hazard because of unequal degradation among the cells when the voltage difference among the cells is less than 300 mV. Yet, if the voltage difference set point among cells is set too low, the cells that are still usable have to be discarded, which thus brings about an economic loss.

SUMMARY OF THE INVENTION

One aspect of the present invention is directed to providing a secondary battery charging method and device that can enhance the stability and extend the life span of the battery.

According to this aspect of the present invention, in a method of charging a secondary battery including several cells, the charging method is changed from one method to another method when a voltage imbalance occurs among the cells. The voltage imbalance may be defined as when the voltage difference among the cells is 100 mV to 300 mV. The charging method may be changed from CC-CV charging to pulse charging. Full-charge conditions in the CC-CV charging process may include conditions of a set voltage or more and a discharge rate of C/20 or less. When the imbalance is less than 100 mV, CC-CV charging may be performed. When the imbalance is 300 mV or more, the electrical path may be blocked. The full-charge condition in the pulse charging method may be a discharge rate of C/20 or less.

According to another aspect of the present invention, a charging device for secondary battery includes: a voltage measuring portion to measure the voltage of a cell; a voltage comparator to compare the voltage of the cell measured by the voltage measuring portion; a voltage imbalance detector to receive a signal from the voltage comparator, and check whether a voltage imbalance occurs among the cells; a charge controller for receiving a signal from the voltage imbalance detector, and output first to third signals to control charging; and a charge setting portion to receive the first to third signals from the charge controller to operate, wherein the charge setting portion comprises a pulse charging portion for performing pulse-charging in response to the third signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
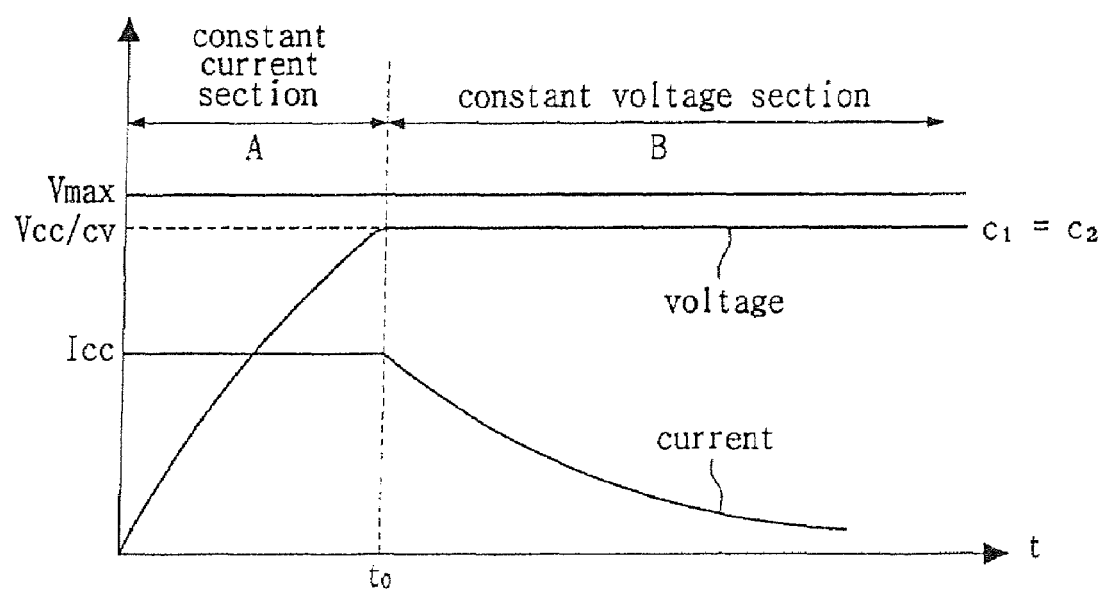
FIG. 1 is a waveform diagram showing the relationship between charging current and charging voltage in normal operation in a method of charging a secondary battery according to an example embodiment of a first aspect of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a waveform diagram showing the relationship between charging current and charging voltage in normal operation in a method of charging a secondary battery according to an example embodiment of a first aspect of the present invention. To explain the first aspect of the present invention, in this example embodiment, it is assumed that two cells are normally operated, and are not affected by other conditions except those characteristics related to the degree of cell degradation.

In FIG. 1, the cells are charged with constant current in section A until they reach a certain voltage (Vcc/cv), and then charged with constant voltage in section B after reaching that certain voltage (Vcc/cv). Hereinafter, section A in which constant current charging is performed is referred to as the constant current section, and section B in which constant voltage charging is performed is referred to as a constant voltage section. That is, when the secondary battery is connected with a charger, first, it is charged with a certain level of constant current (Icc). Here, a constant current of 0.5C to C (where C is the capacity of the cell) is generally applied. When the charging current is C or more, the life span of the battery is shortened, and may be destroyed in the worst case, which is thus not preferable. At time $t_0$, when the voltage charged by the constant current has risen to a predetermined voltage, the charging method is changed to constant voltage charging.

In FIG. 1, two cells $C_1$ and $C_2$, show the same voltage curve, but even if the voltage curves of the cells are different from each other, the cells are charged by a constant current-constant voltage (CC-CV) charging method when the voltage difference between the cells is within 100 mV. Further, this first aspect of the present invention is not limited to a battery having two cells, but can also be applied to a battery having at least three cells.

In this Figure and this embodiment, the battery is fully charged, and thus the charging of the battery is terminated, when a voltage more than the voltage (Vcc/cv) is measured at the time that the constant current charging is changed to the constant voltage charging, and a charging current of C/20 or less is also measured. Also, C indicates that a cell is charged with a current having the same level as the rated capacity of the cell, so C/20 indicates that 1/20 current of the rated capacity of the cell is being applied. For example, when the cell capacity is 1000 mAh, C indicates that the cell is charged with a current of 1000 mA, and thus C/20 indicates that a current of 50 mA, which corresponds to 1/20 of the rated capacity of the cell, is being applied.

Figure 2A:
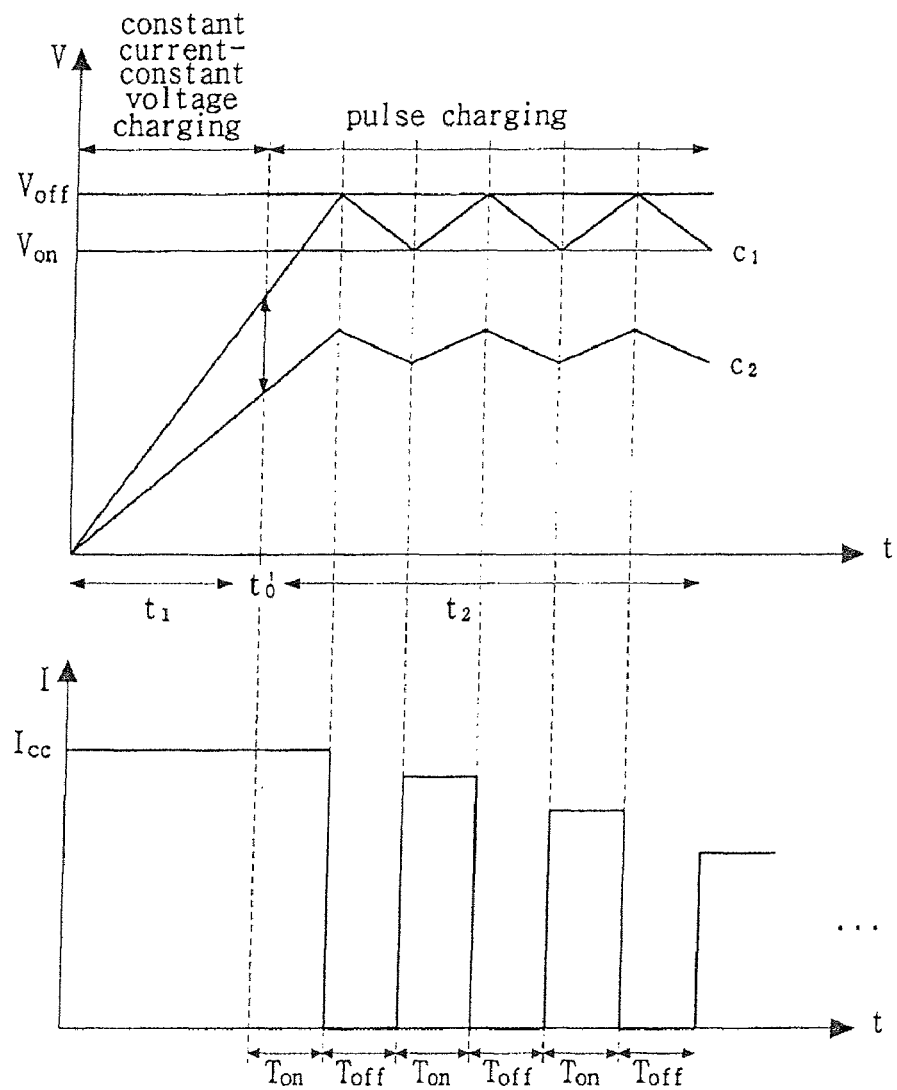
FIG. 2A is a waveform diagram showing the relationship between charging voltage and charging current in abnormal operation in a method of charging a secondary battery according to an example embodiment of the first aspect of the present invention.
Figure 2B:
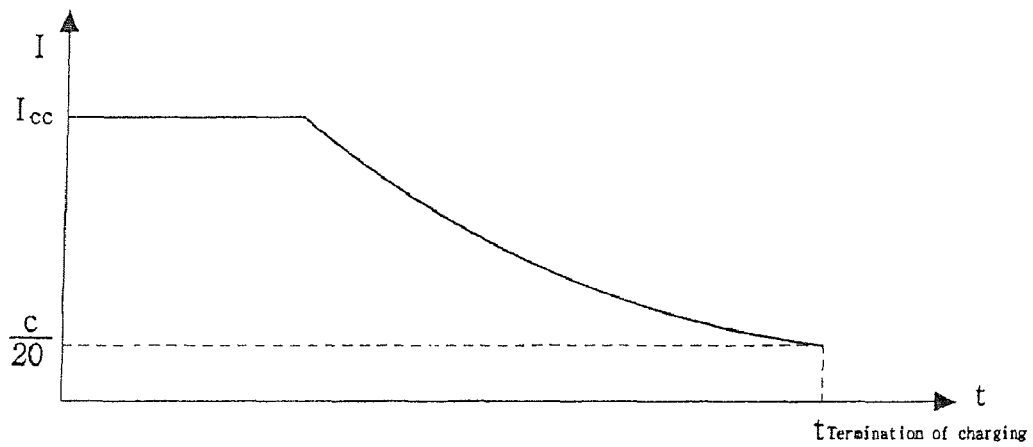
FIG. 2B is a waveform diagram of the change of average charging current as a function of time.

FIG. 2A is a waveform diagram showing the relationship between charging voltage and charging current in abnormal operation in a method of charging a secondary battery according to an example embodiment of this aspect of the present invention, and FIG. 2B is a waveform diagram of the change of average charging current as a function of time.

In FIGS. 2A and 2B, at time $t'_0$, where the voltage difference between the first cell $C_1$ and the second cell $C_2$ is 100 mV to 300 mV during charging using the CC-CV charging method, the charging method is changed to a pulse charging method. That is, in section $t_1$, before a voltage difference of 100 mV to 300 mV is generated, CC-CV charging is performed, and in section $t_2$, after a voltage difference of 100 mV to 300 mV is generated, pulse charging is performed. When the voltage difference between the first and second cells, $C_1$ and $C_2$, is less than 100 mV, those cells that are still usable must be discarded, thus bringing about an economic loss, and when the voltage difference is 300 mV or more, safety problems may occur because of unequal degradation between the cells.

If the first cell $C_1$ degrades faster, the first cell $C_1$ is more rapidly charged than the second cell $C_2$, and thus $C_1$ reaches charge off voltage $V_{off}$ in advance of $C_2$. When the first cell $C_1$ is charged to the charge off voltage $V_{off}$, charging stops, and then the voltage of the first cell $C_1$ drops to the charge on voltage $V_{on}$. If the voltage of the first cell $C_1$ reaches the charge on voltage $V_{on}$, charging is performed again; cell $C_1$ is thus charged by such repeated charges and pauses.

The second cell $C_2$ is charged until the moment that the first cell $C_1$ reaches the charge off voltage $V_{off}$; when the charging of the first cell $C_1$ stops, the charging of the second cell $C_2$ also stops. When the voltage of the first cell $C_1$ drops to the charge on voltage $V_{on}$, charging of the second cell $C_2$ is performed again.

The charging of the cells is performed according to set values of the charge on voltage $V_{on}$ and the charge off voltage $V_{off}$, and an average between the charge on voltage $V_{on}$ and the charge off voltage $V_{off}$ becomes the charging voltage of the first cell $C_1$. Accordingly, if the charge on voltage $V_{on}$ and the charge off voltage $V_{off}$ are set too high, since the first cell $C_1$ may be charged to an overvoltage, these voltages have to be properly selected depending on the capacity of the cell. Further, during the charging of the cell by the repeated charges ($T_{on}$) and pauses ($T_{off}$), when the measured charging current is C/20 or less, it is determined that the battery is fully charged, and thus charging of the cell is terminated.

Figure 3:
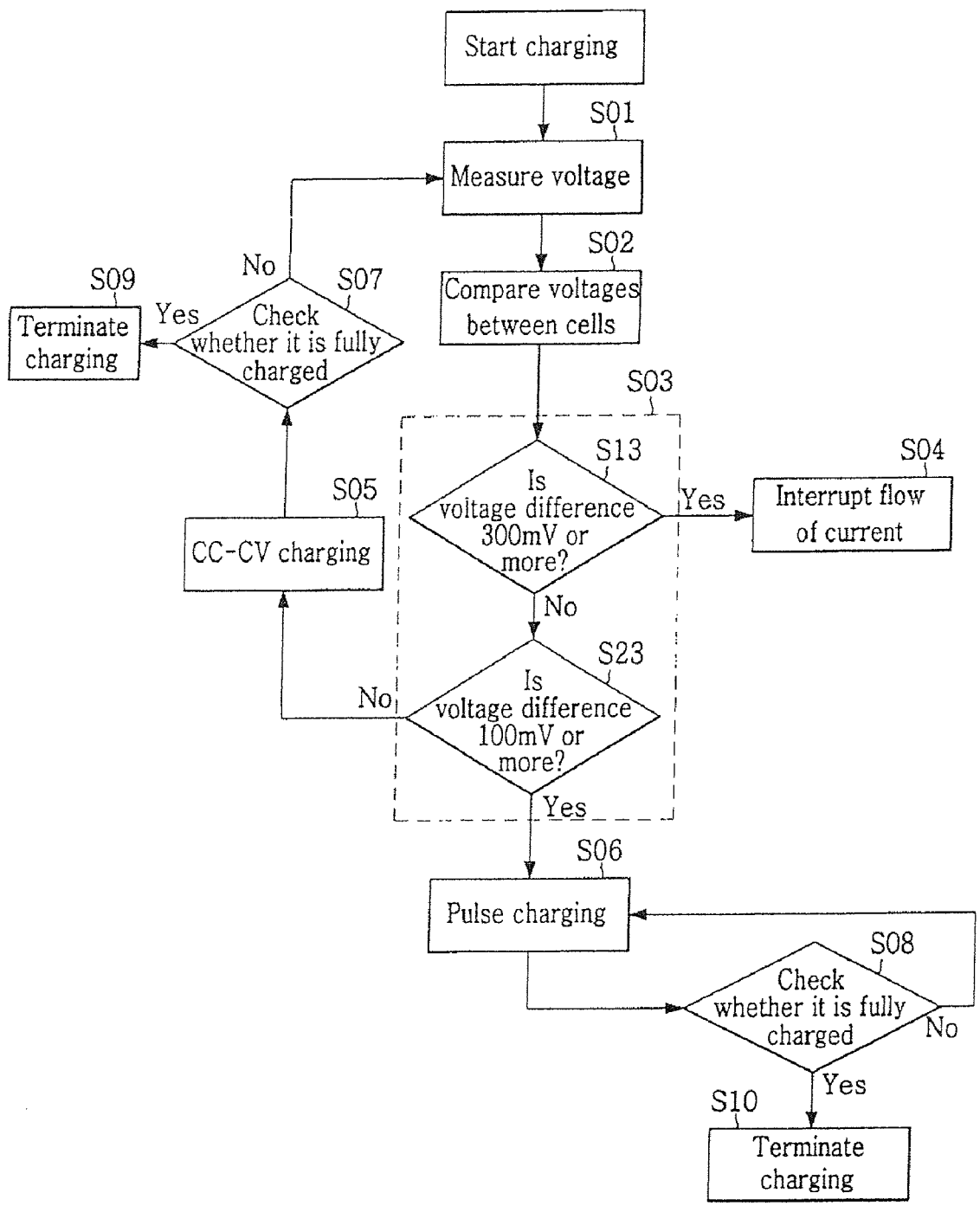
FIG. 3 is a flowchart showing a method of charging a secondary battery according to a second aspect of the present invention.
Figure 4:
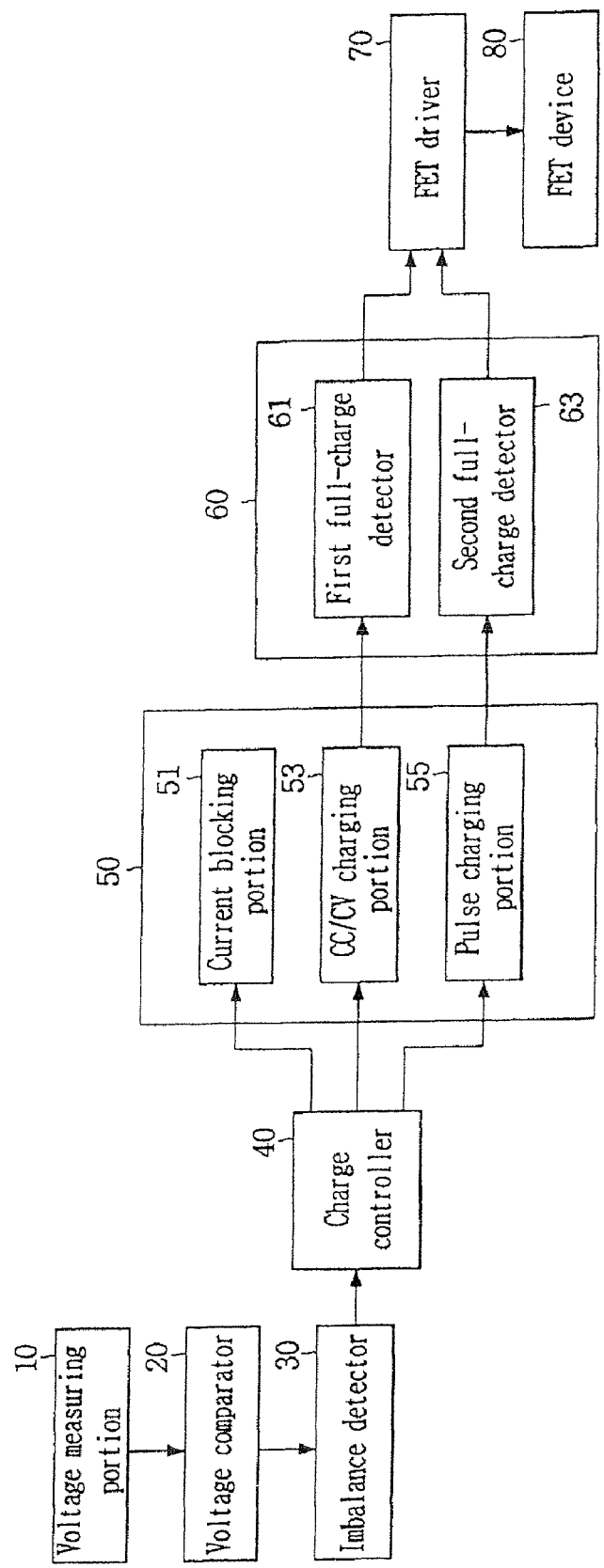
FIG. 4 is a block diagram showing the configuration of a charging device according to the second aspect of the present invention.

FIG. 3 is a flowchart showing a method of charging a secondary battery according to a second aspect the present invention, and FIG. 4 is a block diagram showing the configuration of a charging device according to the second aspect of the present invention. Referring specifically to FIG. 4, a charging device includes a voltage measuring portion 10 for measuring the voltage of a cell, a comparator 20 for comparing measured voltages of cells, an imbalance detector 30 for detecting a voltage imbalance among the cells, and a charge controller 40 for controlling charging in response to a signal output from the imbalance detector 30. The charging device also includes a charge setting portion 50 operating in response to a signal from the charging controller 40 and having a current blocking portion 51, a CC-CV charging portion 53 and a pulse charging portion 55, a full-charge detector 60 having a first full-charge detector 61 and a second full-charge detector 63, an FET driver 70 operating in response to a control signal from the full-charge detector 60, and an FET device 80 turning on or off in response to a signal from the FET driver 70.

Now referring as well to FIG. 3, the voltage measuring portion 10 measures the voltage of a cell (S01), and outputs the signal to the voltage comparator 20. The voltage comparator 20 compares the voltages of cells measured by the voltage measuring portion 10 (S02), and outputs the result to the imbalance detector 30. The imbalance detector 30 checks the occurrence of a voltage imbalance among the cells in response to the result from the voltage comparator 20 (S03).

At first, the imbalance detector 30 checks whether the voltage difference among the cells is 300 mV or more (S13), and if it is 300 mV or more, the imbalance detector 30 generates a signal to the charge controller 40 that the voltage difference is 300 mV or more. If the voltage difference between the cells is less than 300 mV, the imbalance detector 30 checks whether or not it is 100 mV or more or less than 100 mV (S23), and outputs the result to the charge controller 40.

The charge controller 40 controls the charge setting portion 50 according to the voltage difference among the cells that has been received from the imbalance detector 30. The charge controller 40 controls the current blocking portion 51 in the charge setting portion 50 if the signal that the voltage difference between the cells is 300 mV or more has been received from the imbalance detector 30. The charge controller 40 controls the CC-CV controller 53 in the charge setting portion 50 if the signal that the voltage difference between the cells is less than 100 mV is received from the imbalance detector 30. The charge controller 40 controls the pulse charging portion 55 in the charge setting portion 50 if the signal that the voltage difference between the cells is 100 mV to 300 mV is received from the imbalance detector 30.

The charge setting portion 50 operates in response to a control signal received from the charging controller 40, and includes the current blocking portion 51, the CC-CV charging portion 53 and the pulse charging portion 55. The current charging portion 51 interrupts the high current path in response to a control signal received from the charge controller 40 to prevent high current charging of the cell. The CC-CV charging portion 53 charges a cell using a CC-CV charging method in response to a control signal received from the charge controller 40 (S05), and outputs a control signal to the first full-charge detector 61 of the full-charge detector 60. The pulse charging portion 55 charges a cell using a pulse charging method in response to the control signal received from the charge controller 40 (S06), and outputs a control signal to the second full-charge detector 63 of the full-charge detector 60.

The full-charge detector 60 operates in response to the control signal received from the charge setting portion 50, and includes the first and second full-charge detectors 61 and 63. The first full-charge detector 61 operates in response to the control signal received from the CC-CV charging portion 53 of the charge setting portion 50, and checks whether or not the cell is fully charged according to full-charge conditions of the CC-CV charging method (S07). The second full-charge detector 63 operates in response to the control signal received from the pulse charging portion 55 of the charge setting portion 50, and checks whether or not the cell is fully charged according to full-charge conditions of the pulse charging method (S08).

The first and second full-charge detectors 61 and 63 control the FET driver 70 according to whether or not the cell is fully charged, and the FET driver 70 drives the FET device 80 to perform or terminate charging (S09 or S10). The FET device 80 is located on the high current path, and forms the high current path to allow the current to flow in response to an on signal received from the FET driver 70, or blocks the high current path to prevent the flow of current in response to an off signal.

According to aspects of the present invention, when a voltage difference among the cells is less than 100 mV, the cell is fully charged by the CC-CV charging method, and when the voltage difference is 100 mV to 300 mV, the cell is fully charged by the pulse charging method. Consequently, the fully charged cell maintains a voltage difference within 100 mV, thereby enhancing stability and preventing a degradation difference among the cells from becoming larger. This extends the life span of a battery.

According to aspects of the present invention, stability can be improved by preventing a voltage difference among cells from becoming larger than a predetermined level, and the life span of a battery can be extended by preventing a large difference of degradation among the cells.

Although a few embodiments of the present invention have been shown and described, it would be appreciated by those skilled in the art changes may be made in this embodiment without departing from the principle and spirit of the invention, the scope of which is defined in the claims and their equivalents.

What is claimed is:

1. A method of charging a secondary battery comprising a plurality of cells, the method comprising changing charging methods when there is a voltage imbalance among cells;
    wherein the voltage imbalance is a voltage difference among the cells from 100 mV to 300 mV; and
    wherein when the voltage difference among the cells is less than 100 mV, the battery is charged by a constant current-constant voltage (CC-CV) charging method.

2. The method according to claim 1, wherein the charging method is changed from the CC-CV charging method to a pulse charging method.

3. The method according to claim 2, wherein,
    full-charge conditions of the CC-CV charging method include conditions of a set voltage or more and a charging current of C/20 or less,
    C indicates the rated capacity of the cell, and
    C/20 indicates 1/20 of the rated capacity of the cell.

4. The method according to claim 1, wherein the battery's electrical path is blocked when the voltage imbalance is 300 mV or more.

5. The method according to claim 2, wherein,
    full-charge conditions of the pulse charging method include a condition of a charging current of C/20 or less,
    C indicates the rated capacity of the cell, and
    C/20 indicates 1/20 of the rated capacity of the cell.

6. A method of charging a secondary battery, comprising:
    charging a plurality of cells using a CC-CV charging method;

measuring voltages of the cells;
comparing the voltages of the cells; and
changing the charging method to a pulse charging method when the voltage difference between the cells is 100 mV to 300 mV.

7. The method according to claim 6, further comprising:
blocking the electrical path when the voltage difference between the cells is 300 mV or more; and
continuously charging the battery by the CC-CV charging method when the voltage difference is less than 100 mV.

8. The method according to claim 6, further comprising:
checking whether or not the battery is fully charged using the measured voltage; and
terminating charging when the measured voltage satisfies full-charge conditions.

9. The method according to claim 8, wherein:
in the CC-CV charging method, the full-charge conditions include conditions of a set voltage or more and a charging current of C/20 or less,
in the pulse charging method, the charging current is C/20 or less,
C indicates the rated capacity of the cell, and
C/20 indicates 1/20 of the rated capacity of the cell.

10. A device for charging a secondary battery comprising a plurality of cells and using a CC-CV charging method, the device comprising:
a voltage measuring portion for measuring the voltage of each cell;
a voltage comparator for comparing the voltage of each cell measured by the voltage measuring portion;
an imbalance detector for receiving a signal from the voltage comparator, and checking whether a voltage imbalance occurs among the cells;
a charge controller for receiving first to third signals from the imbalance detector, and outputting first to third signals to control charging; and
a charge setting portion for receiving the first to third signals from the charge controller to operate,
wherein the charge setting portion comprises a CC-CV charging portion for performing CC-CV charging in response to the second signal and a pulse charging portion for performing pulse-charging in response to the third signal; and
wherein the second signal is output to perform CC-CV charging in response to a signal from the imbalance detector that the voltage difference between the cells is less than 100 mV, and when the signal from the imbalance detector indicates that the voltage difference among the cells is 100 mV to 300 mV, the CC-CV charging is changed to a different charging method.

11. The device according to claim 10, further comprising:
a full-charge detector including first and second full-charge detectors to operate in response to a signal from the charge setting portion;
an FET driver operating in response to a signal from the first and second full-charge detectors; and
an FET device turning on or off in response to a signal from the FET driver.

12. The device according to claim 10, wherein the charge setting portion further comprises a current blocking portion operating in response to the first signal to interrupt flow of current.

13. The device according to claim 10, wherein the third signal is output in response to the signal from the imbalance detector that the voltage difference among the cells is 100 mV to 300 mV to perform pulse charging.

14. The device according to claim 12, wherein the first signal is output in response to a signal from the voltage imbalance detector that the voltage difference between the cells is 300 mV or more.

15. The device according to claim 11, wherein the first full-charge detector operates in response a signal received from the CC-CV charging portion, and outputs a signal indicating whether or not the battery is fully charged.

16. The device according to claim 11, wherein the second full-charge detector operates in response to the signal received from the pulse charging portion, and outputs a signal indicating whether or not the battery is fully charged.

17. The device according to claim 15, wherein:
the full-charge includes conditions of a set voltage or more and a charge current of C/20,
C indicates the rated capacity of the cell, and
C/20 indicates 1/20 of the rated capacity of the cell.

18. The device according to claim 16, wherein:
the full-charge includes a condition of a charging current of C/20 or less,
C indicates the rated capacity of the cell, and
C/20 indicates 1/20 of the rated capacity of the cell.

19. The device according to claim 11, wherein the FET driver turns off the FET device in response to a full-charge signal received from the first or second full-charge detector, and turns on the FET device in response to a non-full charge signal.

20. A device for charging a secondary battery comprising a plurality of cells, the device comprising:
a voltage measuring portion to measure the voltage of each cell;
a voltage comparator to compare the voltage of each cell measured by the voltage measuring portion;
an imbalance detector to receive a signal from the voltage comparator, and check whether a voltage imbalance occurs among the cells;
a charge controller to receive a signal from the imbalance detector, and output the received signal to control charging; and
a charge setting portion to receive the first to third signals from the charge controller to operate,
wherein the charging method is changed from a constant current-constant voltage charging method to a pulse charging method when the voltage imbalance is between 100 mV and 300 mV.

21. The device of claim 20, wherein the battery is charged by the constant current constant voltage method when the voltage imbalance among cells is 100 mV or less.

22. The device of claim 20, wherein the electric path of the battery is blocked when the voltage imbalance is 300 mV or greater.

23. The device of claim 20, wherein charging of the battery is stopped when the battery is fully charged.

* * * * *

UNITED STATES PATENT AND TRADEMARK OFFICE
CERTIFICATE OF CORRECTION

PATENT NO.         : 8,258,755 B2
APPLICATION NO.    : 12/249401
DATED              : September 4, 2012
INVENTOR(S)        : Jong-Woon Yang Page 1 of 1

It is certified that error appears in the above-identified patent and that said Letters Patent is hereby corrected as shown below:

In the Claims

Column 8, Claim 15, line 10       After "response"
                                  Insert -- to --

Signed and Sealed this
Fifteenth Day of October, 2013

Teresa Stanek Rea
*Deputy Director of the United States Patent and Trademark Office*